(12) United States Patent
Whitcomb (10) Patent No.: US 8,741,025 B2
(45) Date of Patent: *Jun. 3, 2014

(54) NANOWIRE PREPARATION METHODS, COMPOSITIONS, AND ARTICLES

(75) Inventor: David R. Whitcomb, Woodbury, MN (US)

(73) Assignee: Carestream Health, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,397

(22) Filed: Apr. 18, 2012

(65) Prior Publication Data

US 2012/0301349 A1    Nov. 29, 2012

Related U.S. Application Data

(60) Provisional application No. 61/488,926, filed on May 23, 2011.

(51) Int. Cl.
*B22F 9/24* (2006.01)
*B22F 9/16* (2006.01)
*B82Y 40/00* (2011.01)

(52) U.S. Cl.
USPC .................................. 75/371; 75/741

(58) Field of Classification Search
USPC ........................... 420/469, 501, 507
See application file for complete search history.

(56) References Cited

U.S. PATENT DOCUMENTS

2007/0054104 A1*  3/2007  Ittel et al. ............... 428/292.1
2009/0196788 A1*  8/2009  Wang et al. ............... 420/501
2009/0260423 A1*  10/2009 Munoz et al. ............. 73/61.71
2009/0297388 A1   12/2009 Xia et al.
2010/0078197 A1   4/2010  Miyagishima et al.
2011/0173190 A1   7/2011  Von Zwol
2011/0174190 A1   7/2011  Sepa et al.
2012/0297927 A1*  11/2012 Whitcomb ................ 75/343

FOREIGN PATENT DOCUMENTS

JP    2009-155674    7/2009

OTHER PUBLICATIONS

Tang et al. Syntheses of silver nanowires in liquid phase, Nanowires Science and Technology, Feb. 2010, p. 25-42.*
Hong-Yan Shi, et al.,"Ordering of Disordered Nanowires: Spontaneous Formation of Highly Aligned, Ultralong Ag Nanowire Films at Oil-Water-Air Interface," Advanced Functional Materials, 2010, vol. 20, No. 6, pp. 958-964, XP001554277.
International Search Report completed Jul. 5, 2012 for International Application No. PCT/US2012/034143, 3 pages.
Younan Xia, et al., Shape-Controlled Synthesis of Metal Nanocrystals: Simple Chemistry Meets Complex Physics?, Angew. Chem. Int. Ed. 2009, 48, pp. 60-103.
B. Wiley et al., Polyol synthesis of silver nanoparticles: Use of chloride and oxygen to promote the formation of single-crystal, truncated cubes and tetrahedrons, vol. 4, Issue 9, pp. 1733-1739, Sep. 2004.

(Continued)

*Primary Examiner* — Roy King
*Assistant Examiner* — Xiaowei Su
(74) *Attorney, Agent, or Firm* — Reed L. Christiansen (57) ABSTRACT

Methods of preparing metal nanowire are disclosed that employ quaternary phosphonium salts. Such processes can produce long and thin nanowires. Compositions and articles comprising such nanowires are useful in electronics applications.

3 Claims, 5 Drawing Sheets

(56) References Cited

OTHER PUBLICATIONS

Kylee Korte et al., Rapid synthesis of silver nanowires through a CuCl- or $CuCl_2$—mediated polyol process, Journal of Materials Chemistry, 2008, vol. 18, pp. 437-441.

Jinting Jiu, et al., Preparation of Ag nanorods with high yield by polyol process, Mat. Chem. & Phys., 2009, 114, pp. 333-338.

Srichandana Nandikonda, Microwave Assisted Synthesis of Silver Nanorods, M.S. Thesis, Auburn University, Aug. 9, 2010, 59 pages.

\* cited by examiner

NANOWIRE PREPARATION METHODS, COMPOSITIONS, AND ARTICLES

CROSS REFERENCE TO RELATED APPLICATIONS

This application claims the benefit of U.S. Provisional Application No. 61/488,926, filed May 23, 2011, entitled NANOWIRE PREPARATION METHODS, COMPOSITIONS, AND ARTICLES, which is hereby incorporated by reference in its entirety.

BACKGROUND

The general preparation of silver nanowires (10-200 aspect ratio) is known. See, for example, *Angew. Chem. Int. Ed.,* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having desired lengths and widths, however, is not known. For example, the $Fe^{2+}$ produces a wide variety of lengths or thicknesses and the $Cu^{2+}$ produces wires that are too thick for many applications.

When iron or copper are used, they are typically provided as the metal halide salts $FeCl_2$ or $CuCl_2$. See, for example, B. Wiley et al., *Nano Letters,* 2004, 4, 1733-1739 and K. E. Korte et al., *J. Mats. Chem.,* 2008, 18, 437. Other metal halide salts have been used in nanowire synthesis. See, for example, J. Jiu, K. Murai, D. Kim, K. Kim, K. Suganuma, *Mat. Chem. & Phys.,* 2009, 114, 333, which refers to $NaCl$, $CoCl_2$, $CuCl_2$, $NiCl_2$ and $ZnCl_2$, and S. Nandikonda, "Microwave Assisted Synthesis of Silver Nanorods," M. S. Thesis, Auburn University, Auburn, Ala., USA, Aug. 9, 2010, which refers to $NaCl$, $KCl$, $MgCl_2$, $CaCl_2$, $MnCl_2$, $CuCl_2$, and $FeCl_3$, and Japanese patent application publication 2009-155674, which discloses $SnCl_4$. U.S. patent application publication 2011/0174190 discloses nanowire preparation in the presence of tetra-n-butylammonium chloride.

SUMMARY

At least a first embodiment provides methods comprising providing at least one first compound capable of forming at least one first halide ion, where the at least one first compound comprises at least one quaternary phosphonium salt, and reducing at least one first reducible metal ion to at least one first metal nanowire in the presence of at least one of the at least one first composition or the at least one first halide ion. In at least some embodiments, the at least one first halide ion comprises at least one chloride ion or bromide ion.

Some such embodiments further comprise providing at least one second compound comprising the at least one reducible metal ion, wherein at least a first portion of the at least one second compound is provided prior to providing at least a second portion of the at least one first compound. Other such embodiments further comprise providing at least one second compound comprising the at least one reducible metal ion, wherein at least a first portion of the at least one second compound is provided after providing at least a second portion of the at least one first compound. Still other embodiments further comprise providing at least one second compound comprising the at least one reducible metal ion, wherein at least a first portion of the at least one second compound is provided simultaneously with at least a second portion of the at least one first compound.

In at least some embodiments, the at least one quaternary phosphonium salt may be represented by (I):

where:
$R_1$, $R_2$, $R_3$, and $R_4$ each independently comprise an alkyl group, an aryl group, an alkoxy group, or an aryloxy group, and
$X^-$ comprises a halide ion.

The at least one quaternary phosphonium salt may, for example, comprise at least one organic phosphonium halide, such as, for example, tetraphenylphosphonium chloride. The halide ion may, for example, be a chloride ion or a bromide ion.

In at least some embodiments, the at least one first metal ion may, for example, comprise at least one ion from IUPAC Group 11 or at least one coinage metal ion, such as, for example, at least one silver ion.

The at reducing may occur, in at least some cases, in the presence of at least one second metal or metal ion having an atomic number different from that of the at least one first metal ion. In some cases, the reducing may occur in the presence of propylene glycol. Some embodiments employ reducing at at least one temperature between about 90° C. and about 150° C.

Other embodiments provide the at least one first metal product produced according to such methods. Such a first metal product may, for example, comprise at least one metal nanowire. Such metal nanowires may, in some cases, comprise at least one silver nanowire. Some embodiments provide metal nanowires comprising an average length greater than about 10 µm and an average diameter less than about 50 nm.

Still other embodiments provide articles comprising at least one such first metal product produced according to such methods.

These and other embodiments will be understood by the brief description of figures, description, exemplary embodiments, examples, and claims that follow.

DESCRIPTION

All publications, patents, and patent documents referred to in this document are incorporated by reference herein in the entirety, as though individually incorporated by reference.

U.S. Provisional Application No. 61/488,926, filed May 23, 2011, entitled NANOWIRE PREPARATION METH- ODS, COMPOSITIONS, AND ARTICLES, is hereby incorporated by reference in its entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Nanostructures, Nanostructures, and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol (PG), butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 90° C. to about 190° C.

Quaternary Phosphonium Salts

Applicant has discovered that quaternary phosphonium salts may be used to provide halide ions that catalyze (or co-catalyze, with one or more metal or metal ion catalysts) the formation of one-dimensional silver nanowires. Halide ions may thereby be produced in a controlled fashion in contrast to simply adding the halide ion to the reaction mixture in a fixed cation-to-anion ratio.

In at least some embodiments, the at least one quaternary phosphonium salt may be represented by (I):

where:
$R_1$, $R_2$, $R_3$, and $R_4$ each independently comprise an alkyl group, an aryl group, an alkoxy group, or an aryloxy group, and
$X^-$ comprises a halide ion, such as, for example, chloride, bromide, or iodide.

"Alkyl" refers to, for example, straight chain and branched chain alkyl groups having, for example, from about 1 to about 20 carbon atoms, or from about 1 to about 15 carbon atoms, or from about 1 to about 5 carbon atoms. Exemplary alkyl groups include methyl, ethyl, n-propyl, iso-propyl, n-butyl, t-butyl, n-pentyl, ethylhexyl, dodecyl, isopentyl, and the like.

"Aryl" refers to, for example, an aromatic carbocyclic group of from about 6 to 20 carbon atoms having a single ring (e.g., phenyl) or multiple condensed rings (e.g., naphthyl or anthryl) that may or may not all themselves be condensed, provided that the point of attachment of the group is at an aromatic carbon atom. Exemplary aryl groups include phenyl, naphthyl, and the like.

"Alkoxy" refers to, for example, the group "RO—", with "R" being an alkyl group. It also refers to a group comprising a sequence of two or more alkyl groups separated from each other by oxygen atoms, provided that the point of attachment of the alkoxy group is at a terminal oxygen atom, such as, for example, "$R_a$—O—$R_b$—O—". Exemplary alkoxyl groups include methoxy, ethoxy, n-propyloxy, iso-propyloxy, n-butyloxy, t-butyloxy, n-pentyloxy, 1-ethylhex-1-yloxy, dodecyloxy, isopentyloxy, methoxymethyoxy, methoxyethoxy, ethoxyethyoxy, and the like.

"Aryloxy" refers to, for example, the group "RO—", with "R" being an aryl group. It also refers to a group comprising a sequence of two or more aryl groups separated from each other by oxygen atoms, provided that the point of attachment of the aryloxy group is at a terminal oxygen atom, such as, for example, "$R_a$—O—$R_b$—O—". Exemplary aryloxy groups include phenoxy, naphthoxy, and the like.

The at least one quaternary phosphonium salt may, in some cases, comprise at least one organic phosphonium halide, such as, for example, tetraphenylphosphonium chloride.

Mixtures of such quaternary phosphonium salts may be used. Mixtures of such salts with other compounds capable of providing halides may also be used. Mixtures capable of providing more than one type of halide, such as both chloride and bromide, may also be used.

The metal or metal ion catalysts, if used, may be provided as metal halides, as metal cations with non-halide anions, or in any other suitable form. For example, such catalysts may be provided as alkali metal salts, alkaline earth metal salts, metalloid salts, organometallic compounds, transition metal complexes, and the like.

These methods are also believed to be applicable to reducible metal cations other than silver cations, including, for example, reducible cations of other IUPAC Group 11 elements, reducible cations of other coinage metals, and the like. The methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

EXEMPLARY EMBODIMENTS

U.S. Provisional Application No. 61/488,926, filed May 23, 2011, entitled NANOWIRE PREPARATION METHODS, COMPOSITIONS, AND ARTICLES, which is hereby incorporated by reference in its entirety, disclosed the following 12 non-limiting exemplary embodiments:

A. A method comprising:
providing a composition capable of forming at least one first halide ion, said composition comprising at least one quaternary phosphonium salt; and
reducing at least one first metal ion to at least one first metal in the presence of the composition.

B. The method according to embodiment A, wherein the at least one quaternary phosphonium salt is represented by (I):

wherein $R_1$, $R_2$, $R_3$, and $R_4$ each independently comprise an alkyl group, an aryl group, an alkoxy group, or an aryloxy group, and $X^-$ comprises a halide ion.

C. The method according to embodiment A, wherein the at least one quaternary phosphonium salt comprises at least one organic phosphonium halide.

D. The method according to embodiment A, wherein the at least one quaternary phosphonium salt comprises tetraphenylphosphonium chloride.

E. The method according to embodiment A, wherein the at least one first halide ion comprises at least one chloride ion or bromide ion.

F. The method according to embodiment A, wherein the at least one first metal ion comprises at least one element from IUPAC Group 11.

G. The method according to embodiment A, wherein the at least one first metal ion comprises at least one coinage metal ion.

H. The method according to embodiment A, wherein the at least one first metal ion comprises at least one silver ion.

J. The method according to embodiment A, wherein the reducing occurs in the presence of at least one second metal or metal ion having an atomic number different from that of the at least one first metal ion.

K. The at least one first metal product produced according to the method of embodiment A.

L. The at least one first metal product according to embodiment K, said at least one product comprising at least one nanowire.

M. An article comprising the at least one first metal product according to embodiment K.

EXAMPLES

Example 1

A 500 mL reaction flask containing 280 mL ethylene glycol (EG) was stripped of at least some dissolved gases (hereafter, "degassed") by bubbling nitrogen into the solution overnight using a TEFLON® fluoropolymer tube. To the EG was then added 13 mg of tetraphenylphosphonium chloride and 3.3 g of a 3 mM solution of iron (II) acetylacetone in EG. The fluoropolymer tube was then retracted to provide nitrogen blanketing of the headspace of the reaction flask at a 0.5 L/min purge rate. Solutions of 0.77 M polyvinylpyrrolidinone (PVP) in EG and 0.25 M AgNO$_3$ in EG were degassed with N$_2$, then 20 mL syringes of each were prepared. The reaction mixture was heated to 145° C. under N$_2$, then the AgNO$_3$ and PVP solutions were added at a constant rate over 25 minutes via a 12 gauge a TEFLON® fluoropolymer syringe needle. The reaction was held at 145° C. for 90 minutes, and then allowed to cool to ambient temperature.

Figure 1:
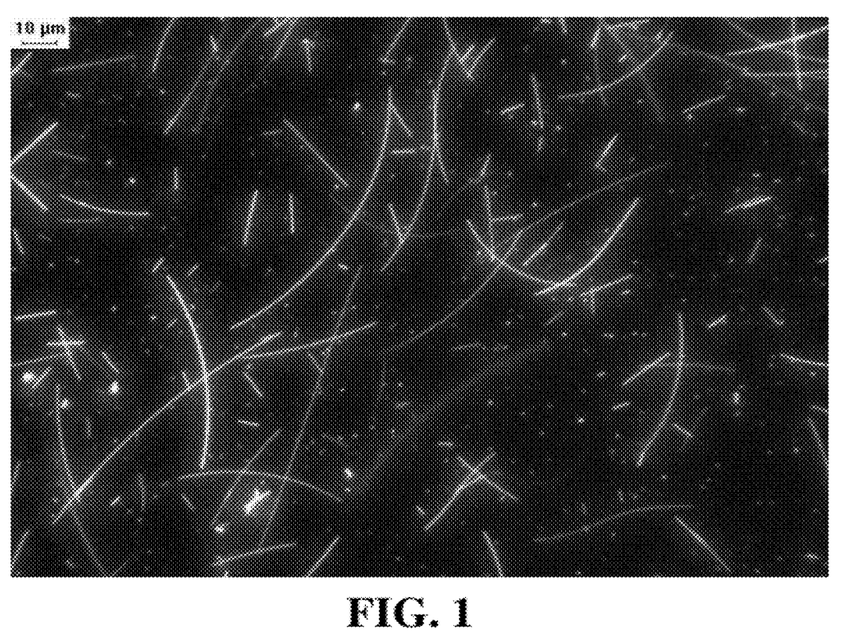
FIG. 1 shows a micrograph of the silver nanowire product of Example 1.

An optical microscope picture of the unpurified silver nanowire product is shown in FIG. 1. Average length and diameter was determined by measuring a sample of at least 100 nanowires. The average nanowire diameter was found to be 135±100 nm and the average length was found to be 20.4±20.2 μm.

Example 2

A 500 mL reaction flask containing 300 mL propylene glycol (1,2-propanediol, PG), 1.9 mg polyvinylpyrrolidinone (PVP, 55,000 molecular weight), and 61.5 mg tetraphenylphosphonium chloride was degassed overnight with N$_2$ using a TEFLON® fluoropolymer tube. The fluoropolymer tube was then retracted to provide nitrogen blanketing of the headspace of the reaction flask at a 0.5 L/min purge rate. A solution of 0.50 M AgNO$_3$ in PG was degassed with N$_2$, then a 20 mL syringe of the solution was prepared. The reaction mixture was heated to 125° C. under N$_2$, then the AgNO$_3$ solution was added at a constant rate over 25 minutes via a 12 gauge TEFLON® fluoropolymer syringe needle. The reaction mixture was held at 125° C. for 60 minutes, and then allowed to cool to ambient temperature.

Figure 2:
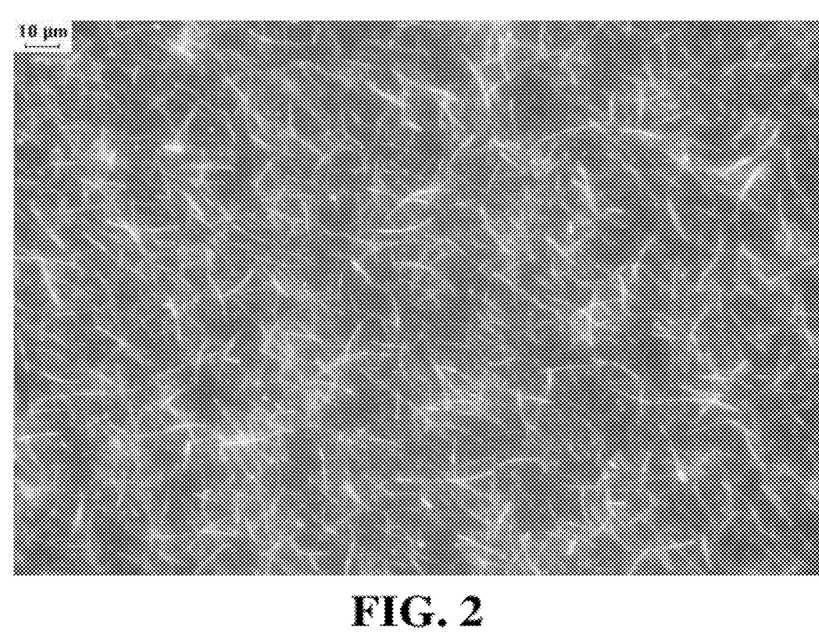
FIG. 2 shows a micrograph of the silver nanowire product of Example 2.

An optical microscope picture of the unpurified silver nanowire product is shown in FIG. 2. Average length and diameter was determined by measuring a sample of at least 100 nanowires. The average nanowire diameter was found to be 46.4±13.4 nm and the average length was found to be 9.9±4.6 μm.

Example 3

A 500 mL reaction flask containing 270 mL propylene glycol (1,2-propanediol, PG), 4.5 mg polyvinylpyrrolidinone (PVP, 55,000 molecular weight), and 78.3 mg tetraphenylphosphonium chloride was degassed overnight with $N_2$ using a TEFLON® fluoropolymer tube. The fluoropolymer tube was then retracted to provide nitrogen blanketing of the headspace of the reaction flask at a 0.5 L/min purge rate. A solution of 1.0 M $AgNO_3$ in PG was degassed with $N_2$, then a 24 mL syringe of the solution was prepared. The reaction mixture was heated to 100° C. under $N_2$, then the $AgNO_3$ solution was added at a constant rate over 120 minutes via a 12 gauge TEFLON® fluoropolymer syringe needle. The reaction mixture was then allowed to cool to ambient temperature.

Figure 3:
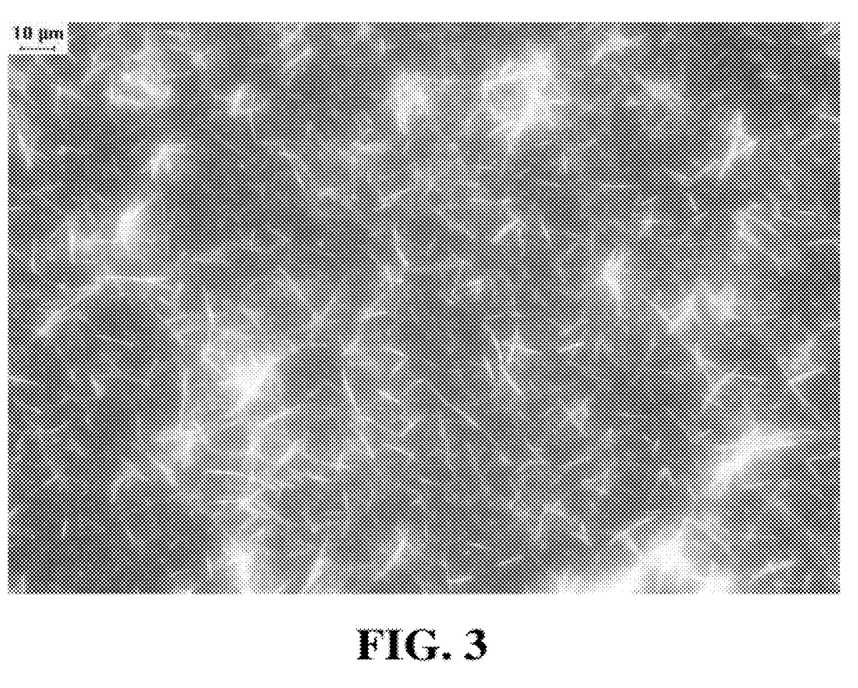
FIG. 3 shows a micrograph of the silver nanowire product of Example 3.

An optical microscope picture of the unpurified silver nanowire product is shown in FIG. 3. Average length and diameter was determined by measuring a sample of at least 100 nanowires. The average nanowire diameter was found to be 53.0±6.8 nm and the average length was found to be 10.2±46.4 μm.

Example 4

A 500 mL reaction flask containing 280 mL propylene glycol (1,2-propanediol, PG) and 1.9 g polyvinylpyrrolidinone (PVP, 55,000 molecular weight), was degassed overnight with $N_2$ using a TEFLON® fluoropolymer tube. The fluoropolymer tube was then retracted to provide nitrogen blanketing of the headspace of the reaction flask at a 0.5 L/min purge rate. Solutions of 0.50 M $AgNO_3$ in PG and 19.3 mM tetraphenylphosphonium chloride in PG were degassed with $N_2$. A 20 mL syringe of the $AgNO_3$ solution and a 9 mL syringe of the tetraphenylphosphonium chloride solution were prepared. The reaction mixture was heated to 110° C. under $N_2$, then the $AgNO_3$ and tetraphenylphosphonium chloride solutions were each added at a constant rate of 0.8 mL/min via 12 gauge TEFLON® fluoropolymer syringe needles. The reaction mixture was held for 1 hour after completion of the tetraphenylphosphonium chloride, cooled to 100° C., held for an additional 4 hours, then allowed to cool to ambient temperature.

Figure 4:
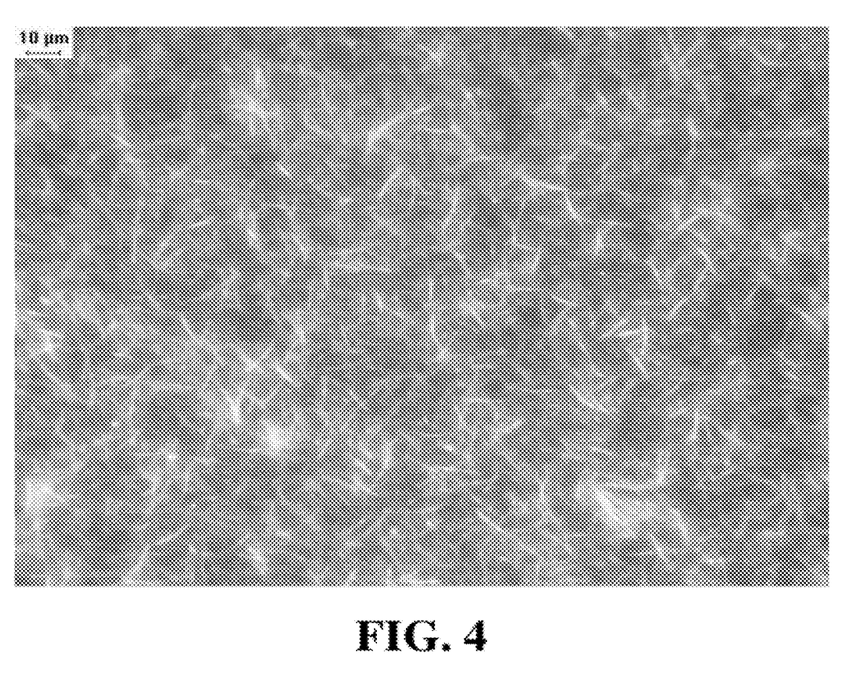
FIG. 4 shows a micrograph of the silver nanowire product of Example 4.

An optical microscope picture of the unpurified silver nanowire product is shown in FIG. 4. Average length and diameter was determined by measuring a sample of at least 100 nanowires. The average nanowire diameter was found to be 44.5±5.5 nm and the average length was found to be 24.0±11.5 μm.

Example 5

A 500 mL reaction flask containing 280 mL propylene glycol (1,2-propanediol, PG) and 4.5 g polyvinylpyrrolidinone (PVP, 55,000 molecular weight), was degassed overnight with $N_2$ using a TEFLON® fluoropolymer tube. The fluoropolymer tube was then retracted to provide nitrogen blanketing of the headspace of the reaction flask at a 0.5 L/min purge rate. Solutions of 1.0 M $AgNO_3$ in PG and 19.3 mM tetraphenylphosphonium chloride in PG were degassed with $N_2$. A 24 mL syringe of the $AgNO_3$ solution and a 24 mL syringe of the tetraphenylphosphonium chloride solution were prepared. The reaction mixture was heated to 110° C. under $N_2$, then the $AgNO_3$ solution was added at a constant rate of 0.2 mL/min via 12 gauge TEFLON® fluoropolymer syringe needles. 10 min after initiating the $AgNO_3$ solution addition, the tetraphenylphosphonium chloride solution was added via a separate syringe pump at a constant rate of 0.8 mL/min. The reaction mixture was held for 2 hrs after completion of the silver nitrate solution, then allowed to cool to ambient temperature.

Figure 5:
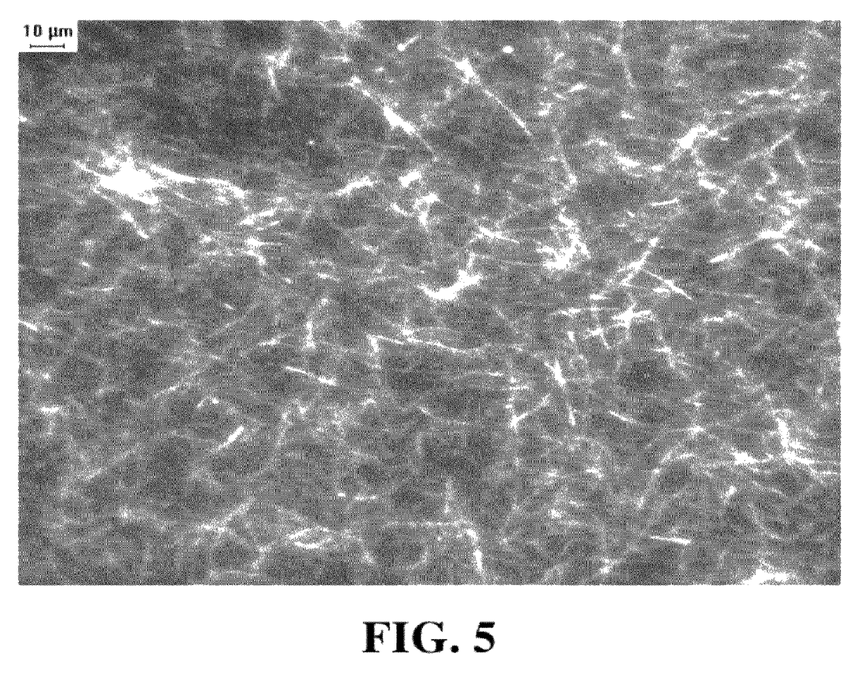
FIG. 5 shows a micrograph of the silver nanowire product of Example 5.

An optical microscope picture of the unpurified silver nanowire product is shown in FIG. 5. Average length and diameter was determined by measuring a sample of at least 100 nanowires. The average nanowire diameter was found to be 44.2±8.9 nm and the average length was found to be 13.9±9.7 μm.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended embodiments, and all changes that come within the meaning and range of equivalents thereof are intended to be embraced therein.

What is claimed:

1. A method comprising:
providing tetraphenylphosphonium chloride; and
reducing silver ions to at least one silver nanowire in the presence of tetraphenylphosphonium chloride or chloride ions formed by tetraphenylphosphonium chloride.

2. The method according to claim 1, further comprising providing at least one second compound comprising the silver ions, wherein at least a first portion of the second compound is provided prior to providing at least a second portion of the tetraphenylphosphonium chloride.

3. The method according to claim 1, further comprising providing at least one second compound comprising the silver ions, wherein at least a first portion of the second compound is provided after providing at least a second portion of the tetraphenylphosphonium chloride.

* * * * *